2,889,289

PHOSPHORUS CONTAINING AZIRIDINYL-AMINE POLYMERS AND FLAME RESISTANT ORGANIC TEXTILES

Wilson A. Reeves, Leon H. Chance, and George L. Drake, Jr., New Orleans, La., assignors to the United States of America as represented by the Secretary of Agriculture No Drawing. Application June 5, 1956
Serial No. 589,563

16 Claims. (Cl. 260—2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to new phosphorus and nitrogen containing polymers, processes for their production and processes of employing these polymers in the flameproofing of certain organic fibrous materials.

In general, the invention relates to polymers capable of being produced by the reaction of a 1-aziridinyl phosphine oxide or sulfide (e.g. a compound that contains at least two 1-aziridinyl groups

attached to pentavalent phosphorus), with an amino compound having a plurality of radicals selected from the group consisting of H and $CH_2OH$ attached to the trivalent nitrogen atoms; and the processes of reducing the combustibility of hydrophilic fibrous organic materials.

We have discovered that compounds that contain at least two 1-aziridinyl groups attached to pentavalent phosphorus atoms react with amino compounds to produce polymers. Such polymers contain the reoccurring connecting structures

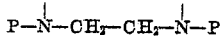

and

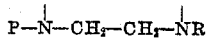

wherein

is an amino radical.

The polymers can be produced in the form of solid synthetic resins. They can be deposited on the surfaces and/or in the interstices of hydrophilic fibrous organic materials, i.e., organic materials which absorb or adsorb water. When such resins are deposited, they reduce the combustibility of hydrophilic fibrous organic materials and resist removal by laundering and the like chemical treatments. The resins can also be deposited on the surfaces of non-hydrophilic materials to form flame resistant coatings.

1-aziridinyl phosphine oxides or sulfides suitable for use in this invention may be represented by the following structure:

wherein

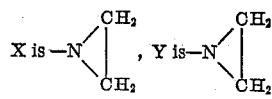

or a dialkyl amine groups such as

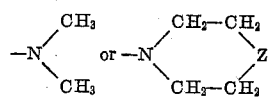

and where Z is oxygen or sulfur. The aziridinyl compounds can be prepared by substantially any of the known processes for producing such compounds. In general, they are prepared by reacting ethylenimine with the corresponding phosphorus halide. The preparation of tris(1-aziridinyl)phosphine oxide $[(CH_2)_2N]_3PO$, has been described by Bestian and coworkers [Bestian et al. Ann. 566, 210–244 (1950)].

Other aziridinyl compounds that undergo reactions described herein consist of compounds or polymers containing the following structures:

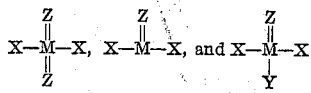

where Z is oxygen, sulfur or nitrogen;

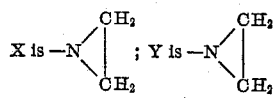

a diakyl amine, an alkyl, an alkylene or an aryl group; and M is phosphorus, including such compounds as

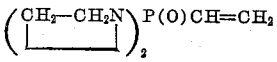

Illustrative examples of suitable amino compounds include: (1) organic amino compounds such as urea and urea derivatives like methylol ureas, alkylated methylol ureas, melamine and melamine derivatives like methylol melamines, alkylated methylol melamines, alkyl substituted melamines such as stearyl melamine, (2) aliphatic amines such as ethylamine, ethylenediamine and cetylamine, (3) amides such as formamide, butyramide, and acrylamide; (4) inorganic amines such as ammonia, hydrazine and hydroxylamine; (5) arylamines such as phenylenediamine, and aniline; and (6) peptide containing materials such as dispersed proteins, wool, leather and the like.

Polymers provided by this invention can be produced in acidic, neutral, and alkaline conditions. They can be produced in the form of liquids or solids and can be molded by the conventional techniques of molding thermosetting resins. These polymers are valuable materials for use in the production of: molded synthetic articles, such as buttons, electrical insulators and the like; synthetic coatings such as protective coatings, and paints and the like having reduced flammability; paper treating resins; and textile treating resins. The aziridine containing compounds also react with protein-containing substances to produce modified polymers with new and useful properties, such as for example wool which is made dimensionally stable.

The polymers provided by this invention are preferably prepared by gently heating an aqueous solution of the aziridinyl phosphine oxide or sulfide and the amino compound until polymerization occurs. The preferred relative amounts of aziridinyl compound and amino compound used to polymerize can be calculated by conventional methods by assuming that: (1) for each aziridinyl group present in the compound, the functionality is one (e.g. if two aziridinyl groups are present, the functionality is two), (2) that the functionality of the amino compound is equal to the sum of —H and —CH$_2$OH groups attached to trivalent nitrogen.

The combustibility of organic fibrous materials can be reduced in accordance with this invention by impregnating the fibrous materials with an aqueous solution, or uniform suspension or dispersion, of the monomeric compounds, or the partially polymerized monomers formed by reacting the monomeric compounds until partial polymerization occurs and curing the impregnated materials at the temperatures conventionally used for curing fibrous organic materials.

Surface active agents, water repellents, and other textile treating agents may be incorporated into the aqueous or emulsion treating media to modify the treated textiles. Surface active softening agents improve tear strength of cotton and rayon fabrics.

The process of this invention can be used to reduce the combustibility of substantially any hydrophilic fibrous material such as cotton, rayon such as viscose rayon, ramie, jute, wool, paper, cardboard and the like materials which can be impregnated with a liquid and dried or cured.

Where a textile is being impregnated, it is of advantage to remove excess impregnating liquor by passing the textile through squeeze rolls prior to drying or curing the impregnated textile. It is also advantageous to dry the textile at about 70° to 110° C. before it is cured at a temperature of from about 100° to 170° C.

The degree of flame resistance imparted to a textile by these phosphorus and nitrogen containing resins can be varied from a low degree to a very high degree by varying the amount of polymer put in the textile.

Some advantages of flameproofing textiles in accordance with this invention are: textiles treated by this process are flame resistant, glow resistant, shrink resistant, and rot and mildew resistant; the effects of the treatment are permanent, and resistant to laundering, dry cleaning, and boiling alkali solutions; cellulosic textile materials retain a very high percentage of their tear and tensile strength; treated textiles are made highly flame resistant with relatively small amounts of the phosphorus and nitrogen containing polymers.

The following examples are illustrative of details of the invention. The terms "parts" or "percent" refers to parts or percent by weight. The term "APO" refers to tris(1-aziridinyl)phosphine oxide and the term "APS" refers to tris(1-aziridinyl)phosphine sulfide.

Example 1

*Ethylenediamine with APO.*—Eight ounce cotton sateen fabric was padded in an aqueous solution containing 15 parts of APO, 5.2 parts of ethylenediamine and 47.1 parts of water (one mole of ethylenediamine per mole of APO). The pH of the solution was 12.1. The wet fabric was dried for 15 minutes at 90° C., then cured 5 minutes at 140° C. After the fabric was thoroughly washed and air dried it contained 13.4% resin. The fabric contained both phosphorus and nitrogen and was highly flame resistant. The hand and strength of the fabric was substantially the same as before the resin was put in it.

A similar piece of fabric was treated exactly as above except that the solution contained 11.8 parts of APO, 6.3 parts of ethylenediamine and 42.2 parts of water (1.5 moles of ethylenediamine per mole of APO). The treated fabric contained 13.5% resin and was highly flame resistant. It was also strong, had a good hand and resisted shrinkage when laundered. The fabric remained flame resistant even after boiling 3 hours in a solution containing soap and sodium carbonate.

Example 2

*1,2-propylenediamine with APO.*—Cotton fabric was padded with a solution containing 10 parts of APO, 6.5 parts 1,2-propylenediamine and 38.5 parts of water. The wet fabric was dried 15 minutes at 90° C. then heated 5 minutes at 140° C. After washing in hot water and air drying, the fabric contained 9.3% resin add-on and had a good hand and was strong.

Example 3

*Hydrazine with APO.*—Fabric was treated exactly as described in Example 2 except that the treating solution contained 15.0 parts APO, 4.2 parts of hydrazine and 44.8 parts of water. The treated fabric contained 9.3% resin after washing and drying. It was highly flame resistant.

The treating solution remaining after the fabric was treated was heated on a steam bath to distill off much of the water. A light brown colored polymer formed that was soluble in hot water.

Example 4

*Hydrazine with APO.*—A solution was prepared containing 5 parts APO, 1.4 parts hydrazine, and 2.6 parts water. The solution was placed in an ice bath for two hours and then allowed to stand at room temperature for two days. An almost colorless flexible polymer was formed. It was cured by heating for two hours on a steam cone. The flame resistant polymer was insoluble in boiling water and acetone. A harder polymer was formed by further curing for 20 minutes at 105° C.

Example 5

*Ethylenediamine with APO.*—A solution was prepared containing 5 parts APO and 2.6 parts ethylenediamine. It was allowed to stand at room temperature for 22 hours and then heated one hour at 85° C. A clear, hard colorless polymer was formed insoluble in boiling water, acetone, and benzene. A harder flame resistant polymer was obtained by further curing for 15 minutes at 115° C. and 10 minutes at 140° C.

Example 6

*Methylol melamine with APS.*—A solution containing 7.5 parts APS, 7.5 parts of trimethylol melamine and 35 parts of water (pH was 7.2) was heated for one hour on a steam cone then spread out to a thin layer (about 3 mm. thick) and heated at 140° C. for 5 minutes. A hard polymer formed that was insoluble in hot water. The polymer contained phosphorus and nitrogen.

Example 7

*Ethanolamine with APS.*—A solution containing 5 parts of APS, 1.6 parts of ethanolamine and 26.4 parts of water was heated 30 minutes over steam (temperature was approximately 75° C.). Then the viscous solution was spread out into a thin layer (about 2–5 mm. thick) and heated for 5 minutes at 140° C. A clear, practically colorless polymer formed. It was very tough and pliable. The polymer was insoluble in water, ethanol and acetone. It would not support a flame when attempts were made to ignite it with a match.

A similar polymer was made by heating 5 parts of APS and 1.6 parts of ethanolamine (without solvent) for 10 minutes at 120° C.

Example 8

*Ammonia with APS.*—19 parts of APS were dissolved in 43 parts of warm water, then 12 parts of concentrated ammonium hydroxide (37% NH$_4$OH) were added. The solution was stirred for 10 minutes and then part of it was used to treat cotton fabric by padding, and drying at 100° C. for 30 minutes. The other part was placed upon a steam cone and heated. After about 30 minutes an oily phase began to drop out. The heating was continued for a total of 1.5 hours then the upper aqueous phase was decanted. The lower oily phase was cooled to about 25° C. at which temperature it became more viscous. It was essentially insoluble in water but was soluble in concentrated and dilute acetic acid. Some of the viscous oil was converted into a hard clear resin by heating a thin film of it for 10 minutes at 120° C. The cured resin did not become discolored when heated at 170° for 40 minutes. The resin contained phosphorus and nitrogen and was highly flame resistant.

*Example 9*

*Urea with APO.*—An aqueous solution was prepared by dissolving 15 parts of APO and 7.8 parts of urea in 53 parts of water. The pH of this solution was 7.6. Part of the solution was used to treat 8 oz. cotton sateen fabric by padding, drying 15 minutes at 85° C., and curing 8 minutes at 140° C. The treated fabric was flame resistant (it passed the 90° angle strip flame test) and remained flame resistant after a vigorous wash with soap and water.

Another part of the solution described above was placed in a watch glass and heated over a steam cone. A hard rubbery polymer formed after about one hour on the steam cone. Upon curing this polymer in an oven at 110° C. for 30 minutes it became very hard and tough. A piece about 1 mm. thick and about 25 mm. wide was very difficult to break with the hands. Some of this slightly amber colored tough polymer was heated an additional hour at 140° C.; this heating did not cause any apparent changes to the polymer. It was flame resistant.

*Example 10*

*Phenylenediamine with APS.*—A solution was prepared by dissolving 30 parts of APS and 26 parts of paradiphenylenediamine in 200 parts of warm water. The solution was heated for 30 minutes on a steam bath then a portion of the solution was placed in the bottom of a glass container so that the depth of the solution was about 3 mm. When the thin layer was heated for 5 minutes at 130° C., it formed a very hard brittle resin. It was insoluble in water and in benzene. The resin was highly flame resistant.

*Example 11*

*Monostearyl melamine with APS.*—A solution was prepared by dissolving 3 parts of APS and 13.4 parts of monostearyl melamine in 40 parts of benzene. The solution was heated 30 minutes on a steam bath and then one hour at 140° C. in a forced draft oven. An amber colored resin formed. It was insoluble in hot benzene. The resin was very tough and flexible. It would not support combustion.

We claim:

1. A polymeric reaction product of tris(1-aziridinyl)-phosphine oxide with urea.

2. A polymeric reaction product of tris(1-aziridinyl)-phosphine sulfide with urea.

3. A polymeric reaction product of tris(1-aziridinyl)-phosphine oxide with ethylenediamine.

4. A polymeric reaction product of tris(1-aziridinyl)-phosphine sulfide with methylol melamine.

5. A process for producing flame-resistant polymers which comprises heating a mixture of an aziridinyl compound selected from the group consisting of poly (1-aziridinyl) phosphine oxides and sulfides having at least two 1-aziridinyl groups and an amino compound having at least two members selected from the group consisting of —H and —CH$_2$OH attached to a trivalent nitrogen atom to cause said aziridinyl compound and said amino compound to react with each other to form a polymeric reaction product, the proportions of aziridinyl compound to amino compound being from about 1:1 to about 1:5, respectively.

6. The process of claim 5 wherein the aziridinyl compound is tris(1-aziridinyl) phosphine oxide and the amino compound is urea.

7. The process of claim 5 wherein the aziridinyl compound is tris (1-aziridinyl) phosphine sulfide and the amino compound is urea.

8. The process of claim 5 wherein the aziridinyl compound is tris (1-aziridinyl) phosphine oxide and the amino compound is ethylenediamine.

9. The process of claim 5 wherein the aziridinyl compound is tris (1-aziridinyl) phosphine sulfide and the amino compound is methylolmelamine.

10. A flame-resistant polymer obtained by heating a mixture of an aziridinyl compound selected from the group consisting of poly (1-aziridinyl) phosphine oxides and sulfides having at least two 1-aziridinyl groups and an amino compound having at least two members selected from the group consisting of H— and —CH$_2$OH attached to a trivalent nitrogen atom to cause said aziridinyl compound and said amino compound to react with each other to form a polymeric reaction product, the proportions of aziridinyl compound to amino compound being from about 1:1 to about 1:5, respectively.

11. The polymer of claim 10 in which the poly (1-aziridinyl) compound is tris (1-aziridinyl) phosphine oxide and the amino compound is urea.

12. The polymer of claim 10 in which the poly (1-aziridinyl) compound is tris (1-aziridinyl) phosphine sulfide and the amino compound is urea.

13. The polymer of claim 10 in which the poly (1-aziridinyl) compound is tris (1-aziridinyl) phosphine oxide and the amino compound is ethylenediamine.

14. The polymer of claim 10 in which the poly (1-aziridinyl) compound is tris (1-aziridinyl) phosphine sulfide and the amino compound is methylolmelamine.

15. A composition for rendering hydrophilic fibrous organic materials flame-resistant which comprises a homogeneous liquid mixture containing an aziridinyl compound selected from the group consisting of poly (1-aziridinyl) phosphine oxides and sulfides having at least two 1-aziridinyl groups and an amino compound reactive with said aziridinyl compound having at least two members selected from the group consisting of H— and —CH$_2$OH attached to a trivalent nitrogen atom, the proportions of aziridinyl compound to amino compound in said mixture being from about 1:1 to about 1:5 respectively.

16. A composition for rendering hydrophilic fibrous organic materials flame-resistant which comprises a homogeneous liquid obtained by heating a mixture of an aziridinyl compound selected from the group consisting of poly (1-aziridinyl) phosphine oxides and sulfides having at least two 1-aziridinyl groups and an amino compound having at least two members selected from the group consisting of H— and —CH$_2$OH attached to a trivalent nitrogen atom for a time sufficient to cause said aziridinyl compound and said amino compound to react with each to form a homogeneous liquid polymeric reaction product but not for so long a time as to produce a solid polymeric reaction product, the proportions of aziridinyl compound to amino compound in said mixture being from about 1:1 to about 1:5, respectively.

References Cited in the file of this patent

UNITED STATES PATENTS

| | | |
|---|---|---|
| 2,582,613 | Wohnsiedler et al. | Jan. 15, 1952 |
| 2,606,901 | Parker | Aug. 12, 1952 |
| 2,654,738 | Lecher | Oct. 6, 1953 |
| 2,660,543 | Walter et al. | Nov. 26, 1953 |
| 2,666,750 | Dickey et al. | Jan. 19, 1954 |
| 2,672,459 | Kuh | Mar. 16, 1954 |
| 2,682,521 | Coover | June 24, 1954 |
| 2,772,188 | Reeves et al. | Nov. 27, 1956 |

FOREIGN PATENTS

| | | |
|---|---|---|
| 854,651 | Germany | Nov. 6, 1952 |
| 863,055 | Germany | Jan. 15, 1953 |
| 888,853 | Germany | Sept. 7, 1953 |